United States Patent
Wern

(10) Patent No.: US 12,134,160 B2
(45) Date of Patent: Nov. 5, 2024

(54) PART PROCESSING APPARATUS WITH DETACHABLE PARTS HOLDER

(71) Applicant: ENGINEERED ABRASIVES, INC., Alsip, IL (US)

(72) Inventor: Michael J. Wern, Alsip, IL (US)

(73) Assignee: Engineered Abrasives, Inc., Alsip, IL (US)

( * ) Notice: Subject to any disclaimer, the term of this patent is extended or adjusted under 35 U.S.C. 154(b) by 265 days.

(21) Appl. No.: 17/672,384

(22) Filed: Feb. 15, 2022

(65) Prior Publication Data
US 2023/0063277 A1 Mar. 2, 2023

Related U.S. Application Data

(60) Provisional application No. 63/239,754, filed on Sep. 1, 2021.

(51) Int. Cl.
*B23Q 7/02* (2006.01)
(52) U.S. Cl.
CPC ...................................... *B23Q 7/02* (2013.01)
(58) Field of Classification Search
CPC .......................................................... B23Q 7/02
See application file for complete search history.

(56) References Cited

U.S. PATENT DOCUMENTS

| | | | | |
|---|---|---|---|---|
| 3,175,820 | A * | 3/1965 | Schiler | B23Q 1/621 269/309 |
| 6,375,177 | B1 | 4/2002 | Witte | |
| 7,900,897 | B2 * | 3/2011 | Bonkowski | B25B 5/08 269/47 |
| 9,248,546 | B1 * | 2/2016 | Wern | B23Q 11/0883 |
| 9,636,793 | B2 * | 5/2017 | Morgan | B23Q 16/024 |
| 2013/0175751 | A1 * | 7/2013 | Canuto | B23Q 3/105 269/311 |
| 2015/0196985 | A1 * | 7/2015 | Wern | B24C 1/10 269/50 |

* cited by examiner

*Primary Examiner* — Seahee Hong
(74) *Attorney, Agent, or Firm* — BakerHostetler

(57) ABSTRACT

The present disclosure includes a shaft and spindle assembly for retaining a part in a part processing assembly. The part is retained on the shaft via a downward force from a part hold-down assembly. The shaft is retained in the spindle assembly that is coupled to a turntable of the part processing assembly. The shaft includes an annular step that abuts against a portion of the spindle assembly to block downward movement of the shaft when the downward force is applied. In this way, the part is retained in a precise location relative to processing nozzles of the part processing assembly even after multiple parts are held down by the part hold-down assembly and processed.

5 Claims, 3 Drawing Sheets

PART PROCESSING APPARATUS WITH DETACHABLE PARTS HOLDER

CROSS-REFERENCE TO RELATED APPLICATIONS

The present application claims priority to U.S. Provisional Application No. 63/239,754, which is hereby incorporated by reference in its entirety.

BACKGROUND

The subject matter disclosed herein relates to a parts holder, and more particularly, to a parts holder for a part processing apparatus. More particularly, the present invention includes a system and apparatus of a removable parts holder for use in retaining parts in an automatic apparatus for processing parts. The part processing apparatus is of a kind like the device as shown in U.S. Pat. No. 5,272,897, which is hereby incorporated by reference.

A parts holder may be used in an automatic part processing apparatus for fully automatically processing a part or work piece by methods such as shot peening and the like. A processing apparatus as shown in U.S. Pat. No. 5,272,897 uses a shaft and spindle assembly to hold up parts or work pieces in the apparatus. A part-hold down assembly is configured to apply pressure to the parts to maintain them in a fixed position on the shaft which processing occurs.

A problem exists in the art, however, in that existing parts holders tend to degrade over time and need to be replaced. In addition, there are a range of parts, of different shapes and sizes, that are processed in part processing apparatuses. It would be worthwhile if parts holders could be easily replaced or swapped out during the course of processing operations. However, to date, there are no parts holders, which can be easily replaced or swapped. Accordingly, what is needed are part processing apparatuses with detachable parts holders.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

The figures show an exemplary parts holder and shaft that extends from the spindle assembly to retain the parts holder.

Figure 1:
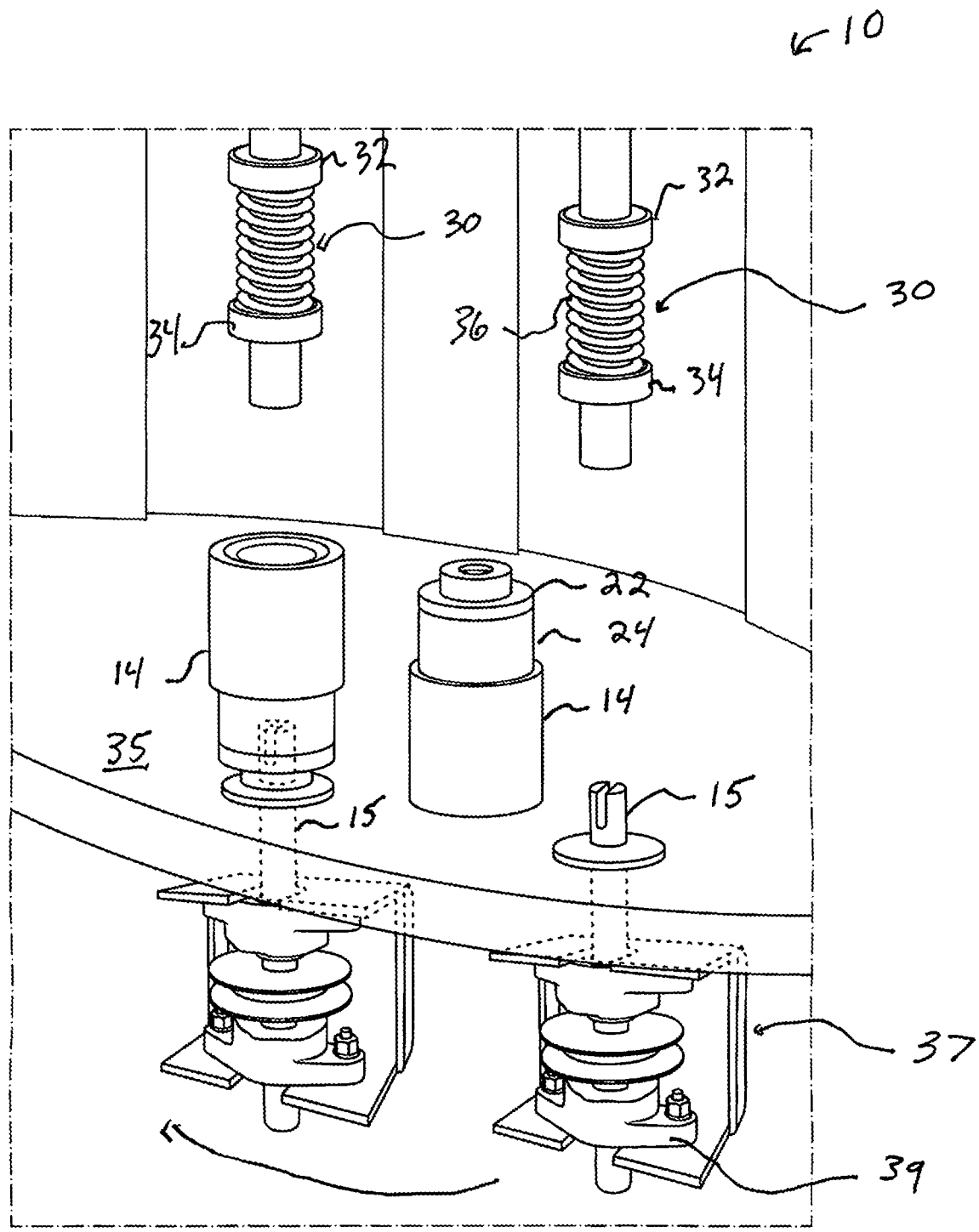
FIG. 1 is a perspective view of a plurality of detachable parts holders in the environment of a work table.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

As shown in FIG. 1, a processing assembly 10 of a larger parts-processing apparatus is shown. The overall part processing apparatus is similar to that as shown and described in U.S. Pat. No. 5,272,897, incorporated by reference herein. While the basic operation of this part processing assembly 10 will be described hereinbelow, the primary focus of the present application will be on the structures and functions associated with a parts holder 14 and shaft 15 associated therewith that support a part 22 being processed in the processing assembly 10. The parts holder 14 in one example may include a support 24. During use of the processing assembly 10, a part 22 can be fixtured on a support 24, as illustrated in FIG. 1. The part 22 may be of varying forms, but may be a hollow component, such as an automotive gear component. In the case of the part 22 being a hollow component, parts holder 14 may include a pin 28 that extends from the support 24 through the cavity of the part 22 to help provide axial alignment of the components. It should be noted that the depiction of support 24 is provided for illustrative purposes only. Parts holder 14 may comprise various shapes and configurations depending on the shape of the parts 22 used in part processing assembly 10 and the requirements of the processing operations performed therein.

While not described herein, reference is made to the incorporated U.S. Pat. No. 5,272,897, with regard to the operation of the overall part processing apparatus. The processing assembly receives a part mounted on the parts holder, which is then processed in an automated manner. The processing in one example includes automated fixturing of a part hold-down assembly against the part, rotation of the part relative to processing nozzles and movement of the part on a turntable through a processing path. For example, one type of process used with such processing assembly may be peening. As shown in FIG. 1 of U.S. Pat. No. 5,272,897, a series of peening nozzles may be directed in a predetermined vicinity and direction of the parts carried on the support. While the process itself is not the subject of the present application, the operation of the process is important because it highlights the need for the structures and functions of the parts holder and the shaft as disclosed herein.

As illustrated in FIG. 1, the part hold-down assembly 30 is used to hold the part onto the parts holder 14 when processing occurs in the processing assembly. Specifically the part hold-down assembly 30 is configured to move downward onto the part 22 and apply a downward pressure or a downward force to the part 22 to retain the part is a fixed position for processing.

The part hold-down assembly 30 in one example includes an upper collar 32, a lower collar 34, and a resilient biasing member 36. The resilient biasing member 36 is shown by way of illustration and not for limitation as a coil spring or other compressive structure. The hold-down assembly 30 is carried on an upper portion of the processing assembly with a shaft providing a point of contact. The lower collar 34 is configured to engage with the part 22 to be processed. Specifically, an end or masking portion can be attached to the corresponding lower collar 34 by use of a corresponding set screw, as illustrated in FIG. 1.

The part hold-down assembly and its masking portion apply the downward force to the part being processed to retain the part in a fixed position while processing occurs. In addition, the masking portion of the part hold-down assembly may also be used to abut against a corresponding surface of the part in order to block or mask processing of that surface of the part. During peening, for example, the surface of the part is shielded by the masking portion, and the peening material exiting the nozzles cannot act on the surface during the peening process.

The downward force applied to the part by the part hold-down assembly 30 provides stability and fixed retainment of the part while processing occurs. Specifically and in illustrative embodiments, the peening nozzles may be configured to peen the part in a precise manner that reduces the amount of excess or wasted peening material and for energy used while the peening process occurs. Therefore, placement of the part relative to the peening nozzles may be predetermined to precise or specific measurements to maximize efficiency. In order to retain the part in a sufficient manner and avoid unintended movement of the part relative to the peening nozzles, a significant amount of downward force is applied to the part through the part hold-down assembly. This, in turn, causes significant force to be applied to the parts holder holding the part.

When mounted on the parts holder 14, the part 22 is processed in the processing assembly by movement of the part along the processing path indicated by an arrow in FIG. 1. A turntable 35 permits the part to travel along the processing path through the processing assembly. Specifically, the processing assembly is configured to carry the part around the processing assembly by rotation of the turntable 35. The parts holder holding the part in one example is attached to the turntable by a shaft and one or more spindle assemblies 37, which are partially shown under the bottom side of turntable in FIG. 1.

In addition to the turntable being 35 rotatable to carry the part around the processing assembly, in one example, the shaft 15 may also be rotatable relative to the turntable 35 in order to rotate the part with respect to an individual nozzle, as illustrated by arrow in FIG. 1. For instance, the shaft 15 of the processing assembly is configured to extend through an aperture in the turntable 35 and is rotatable with respect to the turntable 35 via the spindle assembly 37 that attaches the shaft to the turntable 35. A portion of the spindle 37 assembly may be fixedly attached to a bottom surface of the turntable 35 to secure the spindle assembly 37 and shaft 15 with respect to the turntable 35. The spindle assembly 37 in one example may include a pulley assembly 39. The pulley assembly 39 may include a track through which a belt may be located to move the pulley assembly 39 in a circular rotation. Because the shaft 15 in this example is connected to the pulley assembly 39, the pulley assembly 39 is operable to rotate shaft 15. In this way, a part 22 moves with the turning of the turntable 35 and travels around the processing assembly 10 to be exposed to multiple processing operations along the processing path. In addition, the part 22 is also movable in a rotational direction during processing at each of the processing operations, the part being rotatable on the shaft 15 via the spindle assembly 37.

Figure 2:
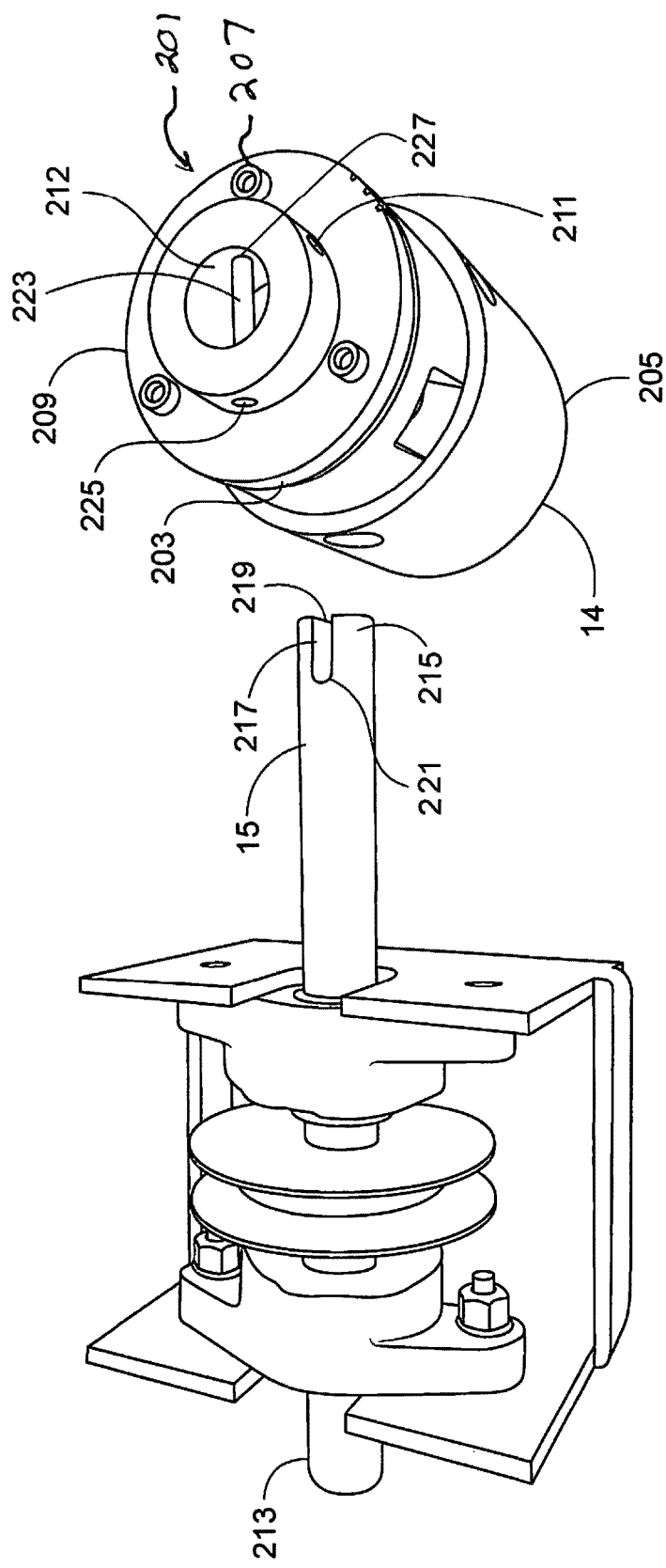
FIG. 2 is one of the detachable parts holders shown in FIG. 1, shown in a perspective view, and detached from a spindle.

Referring FIG. 2, in one example, the parts holder 14 on which a part is fixed is secured to the shaft 15 in a removable or detachable fashion, such that the parts holder 14 may be easily replaced with another parts holder 14. In one example, the parts holder 14 may be secured to shaft 15 through a detachable coupling mechanism 201. The detachable coupling mechanism 201 in one example is attached to a bottom end 203 of parts holder 14. The bottom end 203 of parts holder 14 is opposite to the top end 205 of parts holder 14. The top end 205 of the parts holder 14 is adapted for engagement with the part 22, as discussed in connection with FIG. 1. The bottom end 203 of parts holder 14 is adapted to removably connected with shaft 15 through employment of coupling mechanism 201. The coupling mechanism 201 in one example, may be secured to parts holder 14 with one or more fasteners 207. Examples of fasteners 207 include bolts and screws; however, other mechanisms may be used without departing from the scope of this disclosure. As another example, coupling mechanism 201 may be formed as an integral part of parts holder 14. For instance, coupling mechanism 201 and parts holder 14 may be fabricated or cast as one piece.

In one example, the coupling mechanism 201 includes a first coupling component 209 and a second coupling component 211. In one example, the first coupling component 209 is a circular base plate that is attached to the bottom end 203 of parts holder 14. In one example, second coupling component 211 is a bracket, such as a ring plate that is and attached to first coupling component 209 and includes a recess 212. In one example, first coupling component 209 and second coupling component 211 are centered and aligned along the axis of rotation of shaft 15. In one example, first coupling component 209 and second coupling component 211 may be welded together. In another embodiment, coupling mechanism 201 may comprise a single fabricated or cast component. That is first coupling component 209 and second coupling component 211 may be the same piece. For instance coupling mechanism 201 may comprise an annular flange that is attached to parts holder 14.

In one embodiment shaft 15 includes a first end 213 for engagement with spindle assembly 37 and a second end 215 for engagement with coupling mechanism 201. In one embodiment, a slot 217 is defined by the sidewall of shaft 15. The slot 217 in one example has a first portion 219 and a second portion 221. In one example first portion 219 extends from the second end 215 of the shaft into the interior of shaft 15 where it abuts the second portion 221. In one example, the first portion 219 and the second portion 221 are shaped and dimensioned differently. For instance, the first portion 219 may have a rectangular configuration and the second portion 221 may have a circular configuration In another instance, the second portion 221 may be wider than the first portion 219.

Figure 3:
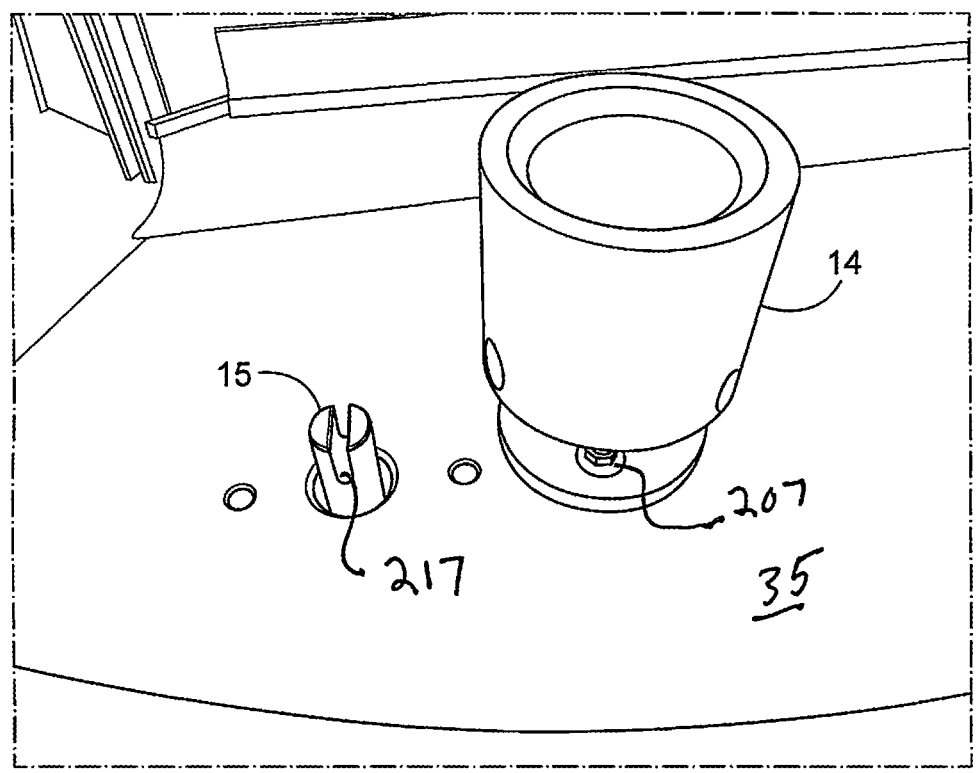
FIG. 3 is a parts holder of FIG. 1, shown in the environment of a work table, detached from a spindle.

Referring further to FIG. 2 and FIG. 3, in one embodiment, to secure parts holder 14 and shaft 15 together, shaft 15 is positioned within recess 212 and a securement member 223 is inserted through a first hole 225 in the sidewall of second coupling component 211, through second portion 221 of slot 217, and into second hole 227 in the sidewall of second coupling component 211. In one example, due to the first portion 219 and the second portion 221 of slot 217 having a different shape and/or dimension, the securement member 223 may fit within second portion 221 of slot 217, but not first portion 219 of slot 217. Accordingly, shaft will be secured together with coupling mechanism 201 and to parts holder 14. Therefore, to secure parts holder 14 to shaft 15, a user places the coupling mechanism 201 over shaft 15 and then inserts a securement member 223 through first hole 225 and out second hole 227. To release the parts holder 14 from shaft 15, the user withdraws the securement member 223 from second hole 227 and first hole 225 and lifts the parts holder 14 off of the shaft 15. In one example, the securement member 223 is a pin. However, this disclosure is not mean to be limited.

Referring now to FIGS. 1-3, a part 22 is attached or fixed on the parts holder of the processing assembly 10, as disclosed herein and in U.S. Pat. No. 5,272,897. The part 22 is then captured between the parts holder and the part hold-down assembly 30, with the part 22 being held in a fixed position by a downward force applied to the part 22 by the part hold-down assembly 30. The part hold-down assembly 30 carried on the shaft 15 is raised and lowered during the automated processing steps making axial alignment of the part hold-down assembly 30 relative to the part 22 carried on the support 24 and the application of force therethrough an important processing step. The downward force applied to the part 22 creates a significant downward force on a shaft 15 supporting the support 24, the shaft 15 being coupled to a turntable 35 at the bottom of the processing assembly 10.

The shaft 15 is attached to the parts holder 14 via coupling mechanism 201. In one example, shaft 15 includes a slot 217, which may include a first portion 219 and a second portion 221, which are shaped and dimensioned differently. Alternatively, slot may be tapered, such that is becomes more narrow as it extends toward the second end 215 of shaft 15. A securement member 223, such as a pin, may be inserted through a hole in a sidewall of coupling mechanism 201 and through the slot 217, which due to the variance in its size and shape, thereby secures the pin within, for example, through a pressfit. As a result, parts holder 14 is readily removable and detachable from shaft 15.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure.

The invention claimed is:

1. A part processing apparatus, comprising:
   a turntable;
   at least one spindle assembly coupled to the turntable, wherein the turntable is operable to move the at least one spindle assembly through a part processing path;
   a slotted shaft coupled to the spindle assembly, wherein the at least one spindle assembly is operable to rotate the slotted shaft as the spindle assembly moves throughout the part processing path and a slot of the slotted shaft is adapted to receive a securement member;
   a parts holder adapted to hold a part as the spindle assembly moves through the part processing path; and
   a coupling mechanism comprising a base plate and the securement member, wherein the base plate is attached to a bottom end of the parts holder, includes an opening to receive the slotted shaft, and is adapted to removably attach the parts holder to the slotted shaft by engaging the securement member with the slot of the slotted shaft, the securement member.

2. The part processing apparatus of claim 1, wherein the slotted shaft has a first end, a second end, and the slot, wherein the slot is positioned between the first end and the second end and is defined by a sidewall.

3. The part processing apparatus of claim 2, wherein the slot extends from the second end, towards the first end, and terminates before reaching the first end.

4. The part processing apparatus of claim 3, wherein the first end is attached to the at least one spindle assembly and the second end is attached to the parts holder.

5. The part processing apparatus of claim 2, wherein the slot comprises a first portion and a second portion, wherein the first portion is shaped different than the second portion.

* * * * *